March 19, 1968     O. STIEBER     3,373,610
SIGHT WINDOW FOR MACHINES AND CONTAINERS
Filed March 6, 1964
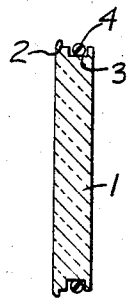
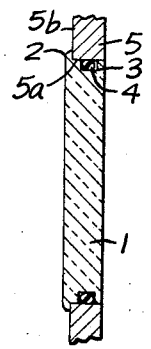
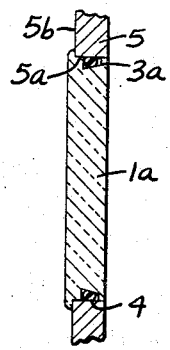
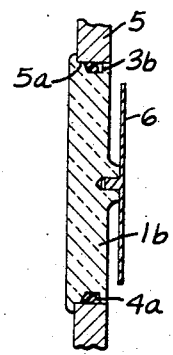
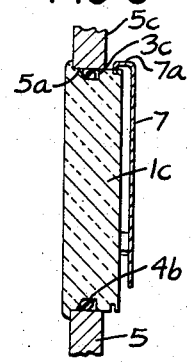
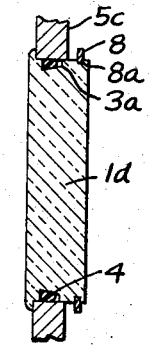
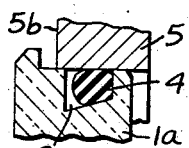
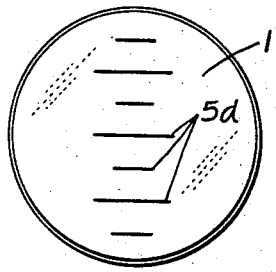
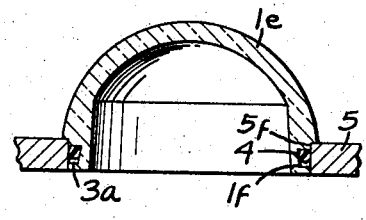
INVENTOR.
ORTWIN STIEBER
BY

United States Patent Office 3,373,610
Patented Mar. 19, 1968

3,373,610
SIGHT WINDOW FOR MACHINES
AND CONTAINERS
Ortwin Stieber, Nassau, Bahamas, assignor to Tepro Technical Production Company Limited, Nassau, Bahamas
Filed Mar. 6, 1964, Ser. No. 349,878
Claims priority, application Switzerland, Oct. 2, 1963, 12,088/63
3 Claims. (Cl. 73—334)

The present invention relates to a sight window for machines, containers, or the like.

In connection with the operation of various machines, it is necessary, from the outside of such machines, to be able to observe mechanical operations or contents thereof, for instance the quantity of oil. This is usually done through sight windows which are so designed that the transparent pane is set in a metal frame which, in its turn by means of a sealing flange, is connected to an observation opening in a housing, or the like. According to another customary arrangement, the metal frame is, by means of a concentrically arranged thread with sealing rim, screwed into a machine housing or container.

Observation windows, especially oil sight glasses, have become known which consist entirely of transparent synthetic material and which have cut or pressed thereinto the thread for screwing such glasses into a housing. The drawback of such arrangements consists in that they cannot be properly tightened because of the low resistance of the respective synthetic material. Therefore, it is difficult to obtain a proper seal with such an arrangement.

Furthermore, with the above-mentioned designs, it is necessary to cut into the machine housing or container a thread, in most instances of considerable diameter, and additionally to provide for a groove-free, smooth concentric sealing surface. Especially with observation windows of large diameter, it is difficult and expensive to produce the thread and the sealing surface. It is for this reason that in practice, the diameter of the observation window with concentrically arranged thread and sealing flange has been made relatively small. In most instances, however, it would be highly advantageous to provide observation windows with large diameter, if this were economically feasible.

Oil sight glasses have become known which have dispensed with the thread in the housing wall but still require a smoothly machined concentric surface. The sight glass itself, however, still requires a thread in connection with the mounting of the sealing device. Such sealing device is so designed that it is installed by means of a pressing nut arranged on the thread of the sight glass and engaging the smoothly machined concentric surface. Such a design, however, results in a considerable wall thickness of the sight glass which, in turn, requires a correspondingly thick wall of the housing. This last-mentioned thickness is usually obtained by a local reinforcement. The drawback of this last-mentioned structure consists in that the sight glass can be installed at predetermined places only but not at any desired portion of the housing wall.

It is, therefore, an object of the present invention to provide an observation window, especially sight glass, for machines, containers and the like, which will not require a thread on the observation window or the housing into which it is to be inserted, nor will require a smoothly machined concentric sealing surface on said housing.

It is another object of this invention to provide an observation window, especially sight glass, as set forth in the preceding paragraph, which can easily and without great expense, be produced with large diameter and installed in any housing wall.

Still another object of this invention consists in the provision of an observation window, especially oil sight glass, for machines, containers and the like, which can easily be mounted in thin-walled housings or housing portions.

These and other objects and advantages of the invention will appear more clearly from the following specification in connection with the accompanying drawing, in which:

FIGURE 1 is a longitudinal section through an observation glass with a sealing ring therearound;

FIGURE 2 shows in section an observation glass according to the invention inserted into a container wall, the sealing ring being compressed between the container wall and the observation glass;

FIGURES 3 to 6 illustrate in sections slight modifications over the arrangement shown in FIGURE 2, especially with regard to the cross-sectional shape of the groove in the observation glass which receives the sealing ring and with regard to the cross-sectional shape of the sealing ring;

FIGURE 3a shows the upper portion of FIGURE 3 on an enlarged scale and with the sight glass pressed somewhat outwardly by pressure from the inside of the container;

FIGURE 7 is a front view of the observation glass showing a graduation thereon;

FIGURE 8 is a still further modification of an observation glass according to the present invention with a semispherical contour.

The body of the observation window consists, in the manner known per se, of transparent material, e.g. of a synthetic material known under the trademark Plexiglas, and, preferably, is of a circular shape. The observation window according to the invention has one or more grooves and a collar which serves as abutment against the housing receiving the observation window. The groove is adapted to receive one or more rings, e.g. an O-ring, of elastic material with the cross-section of the ring being deformed in any suitable manner, in such a way that the ring is pressed against the bottom of the groove as well as against the surface of the bore in the housing wall, or the like, to such an extent that the observation window will be prevented from slipping out of the bore, while at the same time a tight seal is effected between the periphery of the observation window and the adjacent portion of the housing wall, or the like.

More specifically referring to the drawing and FIG. 1 thereof in particular, the observation window 1 is provided with a collar 2 for abutment against the wall of a housing, container or the like into which the observation window is to be inserted. The said collar 2, however, is not necessary under all circumstances. The periphery of the observation window 1 is provided with a groove 3 in which is located a sealing ring 4 of elastic material as, for instance, oil resistant rubber or neoprene.

In conformity with the present invention, groove 3 is so dimensioned that its cross-sectional surface is somewhat greater than the cross-sectional surface of ring 4, whereas the depth of groove 3 is less than the difference between the inner and outer diameters of ring 4 when the latter is not in its compressed condition. Therefore, in this last-mentioned instance, the outer periphery of ring 4 protrudes beyond the outer diameter of the side walls of groove 3, as shown in FIG. 1.

FIG. 2 shows an observation window according to the invention inserted into the bore of the wall 5 of a housing, container, or the like. As will be seen from FIG. 2, when the observation window 1 has been inserted into the bore 5a, ring 4 has been elastically deformed in groove 3 to such an extent that it strongly presses against the bottom of groove 3 and also against the surface of bore 5a of the housing to such an extent that the observation window 1 is normally prevented from slipping toward the outside, while simultaneously a reliable, tight seal is effected between the observation window 1 and the housing or container 5. When collar 2 of observation window 1 engages the outside surface 5b of container 5, observation window 1 occupies its proper position. In this way, the proper installation of the window 1 in container 5 will be greatly facilitated by collar 2.

Referring now to the embodiment of FIG. 3, this embodiment differs from that of FIGS. 1 and 2 primarily in the shape of the groove receiving the sealing ring. More specifically, groove 3a is so designed that its depth at that side thereof which is adjacent the outside surface 5b of container 5 is greater than the depth on the oppositely located side of the groove (see also FIG. 3a). The width of groove 3a is in excess of the cross-sectional diameter or width of ring 4, which latter, after insertion of the observation window 1 into bore 5a of housing 5 under pre-pressure, firmly rests against the bottom of groove 3a and the surface of bore 5a. If the observation window 1a should move slightly outwardly in view of the inner pressure in the housing or the like, as shown on an enlarged scale and in an exaggerated manner in FIG. 3a, ring 4 will move relatively toward the narrower cross-sectional portion of groove 3a. As a result thereof, the cross-section of ring 4 will be compressed further so that in a self-locking manner it will prevent the observation window 1a from being further displaced out of the bore of housing wall 5. Simultaneously, due to the stronger pressure in bore 5a of the housing wall 5, an even more intensive sealing between the observation window 1a and the housing 5 will be effected.

FIGS. 4 and 5 show modifications according to which the groove receiving the sealing ring has a trapezoidal cross-section, while the bottom of the grooves 3b and 3c, respectively, is cylindrical. Rings 4a and 4b of FIGS. 4 and 5 respectively have such a cross-section that in response to a slight outward movement of the observation windows 1b and 1c, respectively, from bore 5a of the housing wall 5, the rings 4a and 4b will respectively tilt in grooves 3b and 3c whereby the outer diameter of the respective rings 4a, 4b will have the tendency to increase. Inasmuch as such increase, however, is prevented by the bore 5a in housing wall 5, it will be appreciated that a higher pressure will be exerted by the respective rings 4a, 4b against bore 5a and the bottom of groove 3b, 3c which, in turn, means that the seal will be even further increased or improved.

When inserting the observation windows 1b, 1c of FIGS. 4 and 5, respectively, into the bore 5a of the housing wall 5, it will be appreciated that due to the tilting of the rings 4a, 4b, the outer diameter thereof will decrease so that the observation window can be inserted into the bore of the housing 5 without encountering any great resistance.

For purposes of facilitating the observation of the oil level or the level of the filling material in the housing or container, the observation windows 1b, 1c of FIGS. 4 and 5, respectively, may be provided with a mirror 6, 7, respectively. Mirror 7 of the arrangement of FIG. 5 may be so designed that its upper end 7a will simultaneously act as abutment for engagement with the housing wall 5c when the observation window 1c is pressed somewhat outwardly. In some instances, it is also advantageous to provide the mirror with a fluorescent surface. The observation window may, of course, in customary manner be provided with a graduation 5d.

In cases in which a considerable over-pressure prevails in the interior of the container or housing wall 5, observation window 1d may be provided with an additional circumferential groove 8a, in conformity with FIG. 6, in which is arranged a spring ring 8 or a similar ring which will serve as abutment against the housing wall 5c so that observation window 1d cannot be pressed outwardly beyond a certain predetermined limit.

Referring now to FIG. 8, this figure shows the application of the present invention to an oil circulating indicator. In this instance, the observation window 1e is of a semi-spherical shape and has a stepped cylindrical section 1f for engagement with the bore 5f of the housing wall 5. The said cylindrical section 1f is again provided with a groove which, in its contour corresponds to the groove 3a of the arrangement of FIG. 3, with a ring 4 therein similar to ring 4 of FIG. 3. The operation or effect of this sealing system is precisely the same as that described in connection with FIG. 3.

It is, of course, to be understood that the present invention is, by no means, limited to the particular constructions shown in the drawings, but also comprises any modifications within the scope of the appended claims.

What I claim is:

1. For insertion into an opening of a wall, especially of a container: light transparent disc means having a peripheral surface portion provided with peripheral groove means, one side of said disc means being provided with radially extending flange means radially protruding beyond said peripheral surface portion, the depth of said groove means increasing in the direction toward said flange means, and elastically deformable sealing ring means arranged in said groove means and in non-compressed condition having an outer diameter in excess of the outer diameter of said peripheral surface portion, said sealing ring means having an inner diameter so as tightly to engage the bottom of said groove means, the width of said groove means exceeding the extension of said ring means in the direction of the width of said groove means.

2. In combination with a wall, especially of a container, having an opening: light transparent disc means having a peripheral surface portion arranged within said opening, said peripheral surface portion being provided with peripheral groove means, the depth of said groove means decreasing in the direction from the outside of said disc means toward the inside thereof, and elastically deformed sealing ring means resting in said peripheral groove means and sealingly and frictionally engaging both the adjacent wall surface confining said opening and the bottom of said groove means thereby sealing said opening and holding said disc means within said opening, the cross-section of said groove means exceeding the cross-section of said elastically deformed sealing ring means in said groove means.

3. In combination with a wall, especially of a container, having an opening: light transparent disc means having a peripheral surface portion arranged within said opening, said peripheral surface portion being provided with peripheral groove means, the cross-sectional shape of said groove means being trapezoidal so that the bottom of said groove means follows the contour of a truncated cone having its smallest diameter at that side of said groove means which is adjacent the outside of said disc means, and elastically deformed sealing ring means resting in said peripheral groove means and sealingly and frictionally engaging both the adjacent wall surface confining said opening and the bottom of said groove means thereby sealing said opening and holding said disc means within said opening, the cross-section of said groove means exceeding the cross-section of said elastically deformed sealing ring means in said groove means.

(References on following page)

References Cited

UNITED STATES PATENTS

| | | | |
|---|---|---|---|
| 1,865,034 | 6/1932 | Naatz | 73—334 |
| 2,681,034 | 6/1954 | Mannion | 73—334 X |
| 2,800,869 | 7/1957 | Barrier | 73—323 X |
| 2,942,469 | 6/1960 | Le Roy | 73—334 |
| 3,123,971 | 3/1964 | Atwood et al. | 73—327 X |
| 3,170,326 | 2/1965 | Knecht | 73—330 |

FOREIGN PATENTS

| | | |
|---|---|---|
| 490,441 | 2/1953 | Canada. |
| 10,466 | 1/1908 | Denmark. |
| 514,133 | 10/1939 | Great Britain. |

LOUIS R. PRINCE, *Primary Examiner*

D. M. YASICH, *Assistant Examiner.*